United States Patent [19]

Gooray et al.

[11] Patent Number: 4,680,040
[45] Date of Patent: Jul. 14, 1987

[54] MULTIPURPOSE FILTERING MATERIAL

[75] Inventors: Arthur M. Gooray, Penfield; George J. Heeks; Louis Reale, both of Rochester; Dipika R. Shah, Pittsford, all of N.Y.

[73] Assignee: Xerox Corporation, Stamford, Conn.

[21] Appl. No.: 820,499

[22] Filed: Jan. 17, 1986

[51] Int. Cl.$^4$ .............................. B01D 53/04
[52] U.S. Cl. ...................... 55/387; 55/512; 55/524; 55/527; 55/DIG. 13; 423/237; 423/581; 502/411; 502/413; 502/417
[58] Field of Search ............... 55/70, 74, 387, 512, 55/524, 527, DIG. 13; 423/210, 235, 237, 239 A, 581; 502/411, 413, 417

[56] References Cited

U.S. PATENT DOCUMENTS

| | | | |
|---|---|---|---|
| Re. 31,849 | 3/1985 | Klein | 55/527 X |
| 3,458,338 | 7/1969 | Adams et al. | 55/527 X |
| 3,483,679 | 7/1969 | Balbierer | 55/527 X |
| 3,516,783 | 6/1970 | Blanchard | 23/4 |
| 3,570,224 | 3/1971 | Clemens | 55/524 X |
| 3,862,420 | 1/1975 | Banks et al. | 250/324 |
| 3,925,248 | 12/1975 | Moroni et al. | 55/DIG. 13 |
| 4,046,939 | 9/1977 | Hart | 55/524 X |
| 4,059,409 | 11/1977 | Barto et al. | 55/387 X |
| 4,128,513 | 12/1978 | Errede et al. | 55/74 X |
| 4,141,703 | 2/1979 | Mulchi | 55/527 X |
| 4,143,118 | 3/1979 | Laing | 423/210 |
| 4,153,505 | 5/1979 | Ferguson | 55/DIG. 13 |
| 4,186,109 | 1/1980 | Alsukawa et al. | 423/239 X |
| 4,202,618 | 5/1980 | Waschk et al. | 355/3 FU |
| 4,270,933 | 6/1981 | Meny et al. | 55/524 X |
| 4,315,837 | 2/1982 | Rourke et al. | 252/430 |
| 4,388,274 | 6/1983 | Rourke et al. | 422/177 |
| 4,401,385 | 8/1983 | Katayama et al. | 355/15 |
| 4,466,813 | 8/1984 | Avritt et al. | 55/74 |
| 4,504,290 | 3/1985 | Pontius | 55/524 X |

FOREIGN PATENT DOCUMENTS

| | | | |
|---|---|---|---|
| 2804154 | 1/1979 | Fed. Rep. of Germany | 55/DIG. 13 |
| 49-87334 | 8/1974 | Japan . | |
| 2118 | 6/1975 | Japan . | |

OTHER PUBLICATIONS

Laing & Meyer-XDJ, vol. 6, No. 5, Sep./Oct. 1981, p. 217.
IPM Technical Disclosure Bulletin, vol. 11, No. 8, Jan. 1969, pp. 944-945.
U.S. Defensive Pub. T940022 To Rodd A.

Primary Examiner—Robert Spitzer

[57] ABSTRACT

A multipurpose filtering material particularly for use in electrostatographic reproducing apparatus has a foraminous support matrix having a plurality of interconnecting voids to permit low impedance to the flow of gaseous material but sufficient to trap particulate material entrained in the gaseous material which is coated with a thin dehydrated alkaline film of an alkali metal silicate to neutralize nitrogen oxide species in the gaseous material and has adhesively bound thereto a particulate neutralizer for another noxious gas the surface of which is substantially exposed to the flow of gaseous material. A filter may be placed in electrostatographic reproducing apparatus at the inlet or outlet of an air stream passing therethrough to neutralize nitrogen oxide species and ozone generated by the corona discharge device, and ammonia from the incoming air.

28 Claims, 5 Drawing Figures

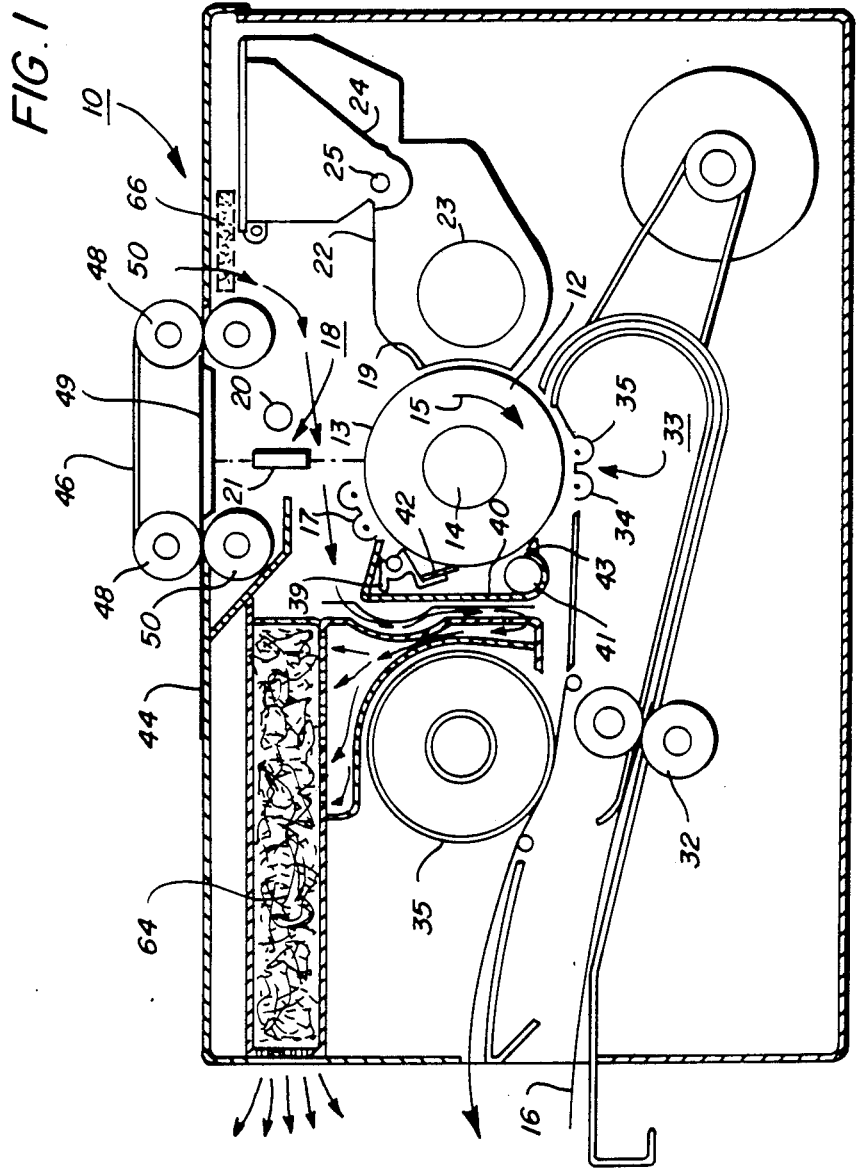

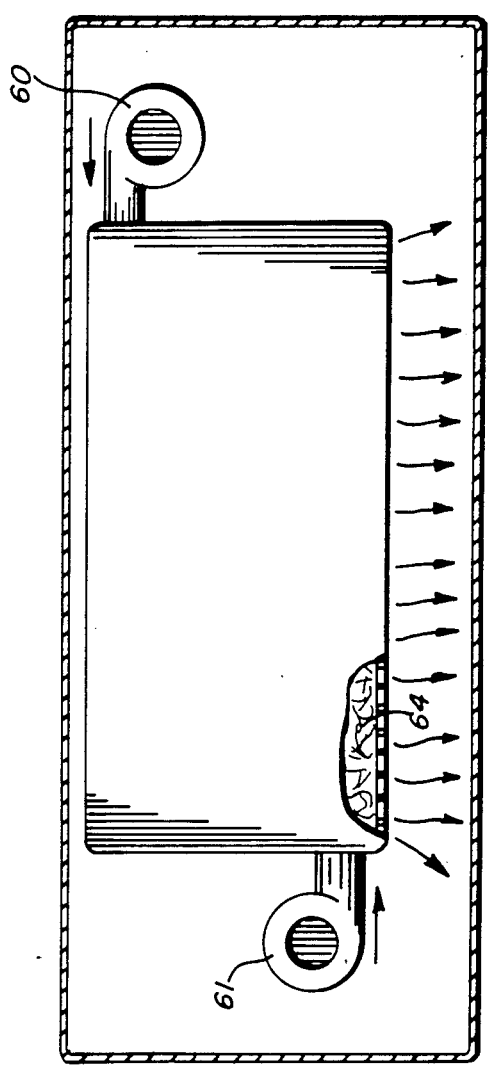

MULTIPURPOSE FILTERING MATERIAL

CROSS REFERENCE TO RELATED APPLICATIONS

Reference is hereby made to copending applications U.S. Ser. No. 703,971, entitled "Corona Generating Device" in the name of Louis (NMI) Reale, filed Feb. 18, 1985; and U.S. Ser. No. 750,845, entitled "Corona Generating Device" in the name of Louis (NMI) Reale, filed June 27, 1985.

BACKGROUND OF THE INVENTION

The present invention relates generally to multipurpose filtering materials, and in particular, to the use of such materials in an electrostatographic reproducing apparatus.

In an electrostatographic reproducing apparatus commonly used today, a photoconductive insulating member may be charged to a negative potential, thereafter exposed to a light image of an original document to be reproduced. The exposure discharges the photoconductive insulating surface in exposed or background areas and creates an electrostatic latent image on the member which corresponds to the image areas contained within the original document. Subsequently, the electrostatic latent image on the photoconductive insulating surface is made visible by developing the image with a developing powder referred to in the art as toner. During development the toner particles are attracted from the carrier particles by the charge pattern of the image areas on the photoconductive insulating area to form a powder image on the photoconductive area. This image may be subsequently transferred to a support surface such as copy paper to which it may be permanently affixed by heating or by the application of pressure. Following transfer of the toner image to the support surface the photoconductive insulating surface may be discharged and cleaned of residual toner to prepare for the next imaging cycle.

Various types of charging devices are used in electrostatographic reproducing apparatus to provide precharge and charge functions with regard to the photoconductive insulating layer and also with regard to transferring the toner image from the photoreceptor to the transfer member, such as copy sheet and subsequently detacking the paper from the imaging surface so that it may be collected.

The operation of the corona discharge devices whether they be negative or positive discharge devices particularly at the higher levels of output corona result in the formation of a variety of noxious gases in the machine. It has long been known that the corona generator results in the formation of ozone in the atmosphere adjacent to the corona generator. Ozone is extremely reactive and can attack machine components as well as being toxic to humans. Relative low concentrations of ozone in the atmosphere, for example, from 1 part per thousand to 1 part per million can cause headaches, nausea, and irritation of mucous membranes. Further, as described in detail in U.S. Ser. No. 703,971, it has been recently found that corona discharge devices that produce a negative corona also produce various nitrogen oxide species which may interact in someway with the photoconductive layers resulting in poor copies. For example, it is believed that these nitrogen oxide species may be adsorbed by the conductive shield as well as the housing of the corona generating device and that, when the machine is turned off for an extended period of idleness, the absorbed nitrogen oxide species are gradually desorbed and interact with the photoconductive layers. It is believed that they in someway interact with the surface of the photoreceptor increasing the lateral conductivity so that it cannot retain a charge in image fashion to be subsequently developed with toner.

The severity of the problem is further compounded by the increased desire to make automatic reproducing apparatus increasingly compact so that various processing stations are enclosed within a smaller and smaller volume. As a result any harmful gaseous species generated by the corotrons tend to increase in concentration in the space within photoreceptor drum cavity.

The nitrogen oxide species tend to stay within the cavity around the drum and provide a loss in line density over time which is fairly perceptible in just a few hours. The problem is compounded in those applications where the drum cavity has an excessively long drum such as one which may be used for copying blueprints and the like in that the length of all the corona generating devices is correspondingly increased thereby dramatically increasing the volume of noxious gases that may be produced during corona generation.

As a result of this desire to further compact the machine in addition to generating excess ozone and other corona byproducts such as, a nitrogen oxide species mentioned above, other difficulties may be encountered. In particular, silicone oils are typically used as fuser release materials in the fuser system of electrostatographic reproducing apparatus and these are found to form what is believed to be oxide products in the form of whiskers on corotron charging devices which tend to reduce the charging efficiency. Furthermore it is possible that the heat generated from the fuser whether it be a fuser roll assembly or radiant fuser be at a level to overheat for the exposure lamp, the photoconductor, the cleaning blade since they are all positioned in such a small area that the heat produced by the fuser cannot escape.

In addition it is possible that some of the nitrogen oxide species generated by the corona generators may react with other materials in incoming air, for example, ammonia to form ammonium nitrates which tend to plate out on elements or surfaces critical to the imaging process.

PRIOR ART

Over the years various techniques and devices have been used to reduce the effect of ozone and other noxious gaseous produced in electrostatographic reproducing machines.

Laing and Meyers in Xerox Disclosure Journal, Vol 6. No. 5. September/October 1981, page 217, show a device which is a filter to remove fine particles suspended in air and a second filter to remove ozone and other noxious gases. The ozone removable material may be a Hopcalite impregnated foam or an activated carbon fibrous material. The particulate filter may be any of the known foraminous filtering materials, such as paper or felt.

IBM Technical Disclosure Bulletin, Vol. 11, No. 8, January 1969, pages 944 and 945 disclose an ozone filter for electrophotographic copying apparatus comprising charcoal impregnated with sodium iodide.

United States Defensive Publication No. T940,022 to Rodda describes a pressurized and filtered xerographic system wherein amine contaminants which may cause selenium alloy photoreceptor image deletions are removed by filter materials such as activated charcoal or Hopcalite.

Japanese Laid-Open Patent Application No. 87334/74 describes a method for decomposing ozone in electrophotographic duplicating apparatus with a rubber like olefin polymer having an unsaturated group or groups.

Japanese Patent Application No. 2118/73 disclose apparatus for including a filter means with at least one layer containing activated carbon to provide a substantially ozone free air exhaust from a copying apparatus.

SUMMARY OF THE INVENTION

In accordance with the principle aspect of the present invention, a multipurpose filtering material comprising a foraminous support matrix having a plurality of interconnecting voids to prevent low impedance to the flow of gaseous material therethrough but sufficient to trap particulate material entrained in the gaseous material, is coated with a thin dehydrated alkaline film of an alkali metal silicate to neutralize nitrogen oxide species in the gaseous material, and has adhesively bound thereto, a particulate neutralizer for another noxious gas whose surface is substantially exposed to the flow of the gaseous material.

In accordance with another aspect of the present invention, the dehydrated alkaline film is a dehydrated product of an aqueous solution of sodium or potassium silicate.

In accordance with another aspect of the present invention, the foraminous support matrix is a reticulated open cell foam or a high loft fibrous material.

In accordance with another aspect of the present invention, the particulate neutralizer is activated carbon.

In accordance with a further aspect of the present invention, the multipurpose fibrous material is made by immersing the support matrix in an aqueous solution of the alkali metal silicate and before the solution has dehydrated contacting the support matrix with the particulate neutralizer, drying the filter material to bind the particulate neutralizer to the support matrix.

In accordance with a further aspect of the present invention an imaging apparatus such as for example an electrostatographic apparatus including at least one corona discharge electrode, means for circulation of an air stream into, through and out of said apparatus is provided with a multipurpose filtering material through which the air stream is directed.

For a better understanding of the invention as well as other aspects and further features thereof references is had to the following drawings and descriptions.

BRIEF DESCRIPTION OF THE DRAWINGS

FIG. 1 is an illustrative cross section of a electrostatographic reproducing apparatus which may employ the multipurpose filtering material according to the present invention.

FIG. 2 is a schematic illustration of the air stream being pulled through the filtering material by a fan.

BRIEF DESCRIPTION OF THE PREFERRED EMBODIMENT

Figure 3A:
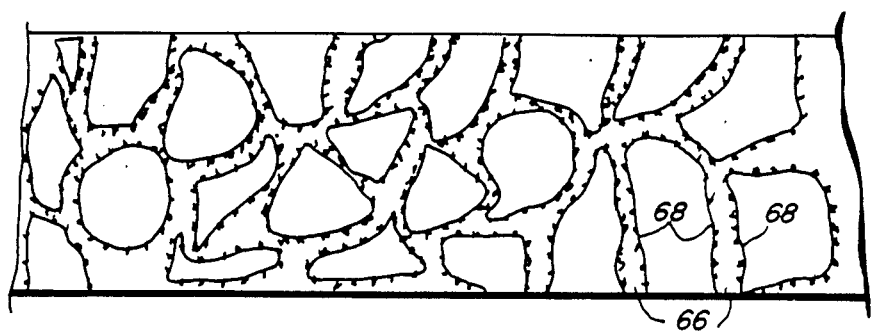
FIGS. 3a and 3b are illustrations of a reticulated open cell foam having an alkaline coating and neutralizing particles thereon according to the present invention.

Referring now to FIG. 1, there is shown by way of example the operational element organizational geometry of an automatic electrostatographic reproducing machine 10 which may use the present invention. Reproducing machine 10 depicted in FIG. 1 illustrates the various operational elements and components utilized for producing copies from an original document. Although the apparatus of the present invention is particularly well adapted for use in an automatic xerographic reproducing machine 10, it should become evident from the following description that it is equally well suited for use in a wide variety of processing systems including other electrostatographic systems and it is not necessarily limited in the application to the particular embodiment or embodiments shown herein.

The reproducing machine 10, illustrated in FIG. 1 employs an image recording drum-like member 12, the outer periphery of which is coated with a suitable photoconductive material 13. The drum 12 is suitably journaled for rotation within a machine frame (not shown in this Figure) by means of shaft 14 and rotates in the direction indicated by arrow 15 to bring the image-bearing surface 13 thereon past a plurality of xerographic processing stations. Suitable drive means (not shown) are provided to power and coordinate the motion of the various cooperating machine components whereby a faithful reproduction of the original input scene information is recorded upon a sheet of final support material 16 such as paper or the like.

Initially, the drum 12 moves the photoconductive surface 13 through a changing station 17 where an electrostatic charge is placed uniformly over the photoconductive surface 13 in known manner preparatory to imaging. Thereafter, the drum 12 is rotated to exposure station 18 where the charged photoconductive surface 13 is exposed to a light image of the original input scene information whereby the charge is selectively dissipated in the light exposed regions to record the original input scene in the form of an electrostatic latent image. At the exposure station, the image received on the drum is one which is formed by illuminating the document by exposure lamp 20 and transmitting the image through lens assembly 21 to the photoconductive surface. The lens assembly 21 comprises a bundled array of gradient index optical fibers which are produced under the trade name 'SELFOC' in Japan by Nippon Sheet Glass Co., Ltd. and which are described in U.S. Pat. No. 3,658,407 to Kitano et al. After exposure, drum 12 rotates the electrostatic latent image recorded on the photoconductive surface 13 to development station 19 wherein a conventional developer mix is applied to the photoconductive surfaced of the drum 12 rendering the latent image visible. Typically a suitable development station could include a developer housing 22, a magnetic brush development roll 23 utilizing a magnetizable developer mix having coarse ferromagnetic carrier granules and toner colorant particles which is dispensed from dispenser 24 by dispenser roll 25.

Sheets 16 of the final support material are manually fed to the registration system 32. The sheet is then forwarded to the transfer detack station 33 in proper registration with the image on the drum. The developed image on the photoconductive surface 13 is brought into contact with the sheet 16 of final support material within the transfer station 33 and the toner image is transferred from the photoconductive surface 13 to the contacting side of the final support sheet 16. Following transfer of the image the final support material which may be paper, plastic, etc., as desired is transported through detack station where detack corotron 34 uniformly charges the support material to separate it from the drum 12.

After the toner image has been transferred to the sheet of final support material 16 the sheet with the image thereon is advanced to a suitable fuser 35 which coalesces the transferred powder image thereto. After the fusing process the sheet 16 is advanced to a suitable output device such as a tray, for example.

Although a preponderance of toner powder is transferred to the final support material 16, invariably some residual toner remains on the photoconductive surface 13 after the transfer of the toner powder image to the final support material. The residual toner particles remaining on the photoconductive surface 13 after the transfer operation are removed from the drum 12 as it moves through a cleaning station 39 which includes cleaner housing 40 and auger 41. The toner particles may be mechanically cleaned from the photoconductive surface 13 by any conventional means as, for example, by the use of a cleaning blade 42.

The document 44 is transported past the optical system and the copy sheet 16 is delivered to the transfer station in synchronism and at the same speed so that a faithful reproduction may be obtained. This is accomplished through the use of a registration system 32 which first registers the copy sheet and then drives it forward at a speed synchronized to that of the document transport which includes a document belt 46 supported about drive rolls 48 in contact with nip rolls 50 which transports the document across the viewing platen 49.

It is believed that the foregoing general description is sufficient for purposes of the present application to illustrate the general operation of an automatic xerographic copier 10 which can be used in the apparatus in accordance with the present invention.

Also illustrated in FIG. 1 and with additional reference to FIG. 2 is the circulation path of an air stream into through and out of the electrostatographic reproducing apparatus. As illustrated air may be taken in through the top of the machine near the document handler passed through the exposure and charge stations, circulated behind the cleaning station and passed through a manifold over the fuser roll up into a multipurpose filtering material, according to the present invention. As illustrated in FIG. 2, the air stream is created by two centrifugal fans 60, 61 pulling air through the machine and into the multipurpose filtering material 64 with the air stream exiting out the front of the machine. Representative filter structure would comprise a material about 10 inches by 10 inches by 1 and ½ inches.

In an alternative embodiment, the multipurpose filtering material according to the present invention may be positioned in the inlet portion of the air stream in the event that contaminates in the air need to be removed. This is illustrated by the dotted line filter 66 in FIG. 1.

With additional reference to FIGS. 3 and 4, the multipurpose filtering material according to the present invention will be described in greater detail.

Figure 3B:
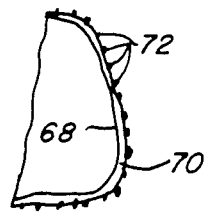
Figure 4:
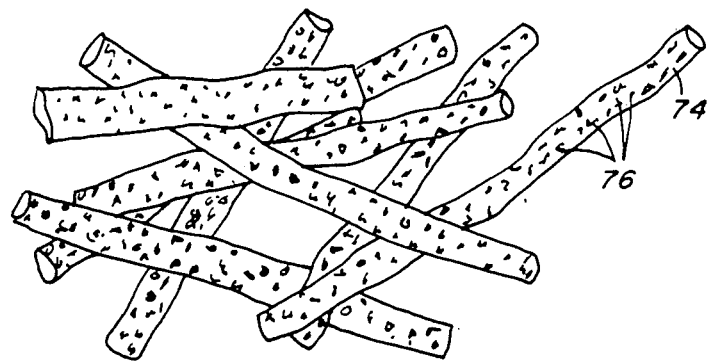
FIG. 4 is an illustration of glass fiber filtering material having an alkaline coating and neutralizing particles thereon.

In FIG. 3a a reticulated open cell foam structure is generally illustrated comprising interconnecting cell voids 66 separated by a boundary layers 68 having coated thereon a thin layer of a dehydrated alkaline film 70 which has adhesively attached thereto additional particulate neutralizing material 72. (See FIG. 3b which is an enlarged partial view.) FIG. 4 is a similar structure illustrating the use of a plurality of fibers, glass for example, having coated thereon a thin layer of adhesive alkaline film 74 and also having embedded in the surface thereof particulate neutralizing material 76 which is substantially exposed to the air. The filter material may be of any suitable size including length, width and thickness dimensions to accommodate its particular purpose. Typically, when connected to an inlet or exhaust manifold it will be of the size of the inlet or exhaust ports so that all the inlet or exhaust gases pass therethrough. Preferably the foraminous support material has a plurality of interconnecting voids to permit a relatively low impedance to the flow of gaseous material therethrough but is sufficient to trap most particulate material entrained in the gaseous material. It will be understood that the appropriate balance between surface area and impedance may be selected based on the particular application for the filter. It should be noted that as the surface area per unit volume of the foraminous support matrix is increased, the impedance to air flow is also increased.

The foraminous support matrix may be selected from any suitable material including, foams, woven and unwoven fibrous material, felt, paper may in fact be constituted of particulate substrates such as sand or gravel. Selection of the foraminous material will depend upon the trade-off between the surface area and impedance and the particular application. A particularly preferred material is a reticulated open cell foam of rigid or flexible, natural or synthetic materials such as natural sponges and ester or ether type polyurethanes having a standard pore size of from about 4 to about 40 pores per linear centimeter providing an air pressure drop across a foam thickness of 25 mm of from about 4.7 to about 92 mm of water when tested at an air flow of 175 meters per minute. Another preferred material would be a fibrous material in a physical matrix providing a low impedance as described with reference to the foams and comprising woven and unwoven fibers such as cellulose, polyesters, glass and polypropylene. Foam is particularly preferred in providing a low impedance (very low pressure drop across the foam layer), and also functions well as a particulate entrapment material thereby providing further filtering efficiency. In addition, a variety of foams are commercially available at economical prices.

The support matrix of the filter is substantially coated with a thin dehydrated alkaline film of alkali metal silicate to neutralize the nitrogen oxide species that may be generated by the corona charging devices. The exact mechanism by which the alkali metal silicate neutralizes the nitrogen oxide species is not fully understood. However, it is believed that the cation of the alkali metal silicate combines with the nitrogen oxide species to form alkali metal nitrates in an irreversible reaction and therefore completely removes the possibility of the nitrogen oxide species from acting dilatoriusly on the photoreceptor and other surfaces. It is also believed any silicate anions present combine with any hydronium ions present in the hydrated nitrogen oxide species to neutralize the hydronium ions. While the alkali metal nitrates that may be formed are not totally insoluble in water and therefore in a high humidity environment become partly solubilized by water in air, the severity of this mechanism is such as not to be a deterrent to the favorable action otherwise achieved. In order to form this irreversible neutralization of nitrogen oxide specie, the alkaline film should be sufficiently thick that it will not be consumed in a reasonable amount of time thereby limiting the operation of the filter. Accordingly, it is preferred that the dehydrated film be at least 5 microns in thickness to provide an acceptable operational life.

The dehydrated alkali metal silicate films may be formed on the foraminous support matrix by applying an aqueous alkali metal silicate solution as a thin film. Upon heating the liquid films dehydrate to provide a strong rigid inorganic adhesive bond to the substrate matrix. Typically the films can be applied by spraying or brushing as with a paint or by immersing the matrix material in a bath. The sodium, potassium and lithium silicate films may be formed from any suitable commercial aqueous solution of sodium potassium or lithium silicates. Typically, the aqueous solutions of sodium silicate are available having a silica to oxide weight ratio of from about 1.6 to about 3.75, density within the range of 35° Bé to 59° Bé when measured at 20° C., a solids content from about 30 percent to about 55 percent by weight, and a viscosity of from about 200 to 800 centipoises. The aqueous potassium silicate solutions commercially available typically have a silica to oxide weight ratio of from about 2.1 to 2.5, a density of about 30° Bé to about 40° Bé when measured at 20° C., a solids content of from about 25 to 40 percent by weight and a vicosity of from about 7 to 1050 centipoises. A silica oxide ratio of 2.5 is preferred since it exhibits high water resistance. The aqueous lithium silicate solutions typically have a silica to oxide weight ratio of from about 4.6 to 5.9, density of from about 18° Bé to about 36° Bé, a viscosity of about 180 centipoises and a solids content of about 22 percent by weight.

The particulate neutralizer employed may be selected from commercially available materials used to neutralize noxious or undesired gases present in an effluent or input gaseous flow. In a preferred embodiment according to the present invention it is selected from the group of materials known to catalytically decomposed ozone or materials which are known to adsorb ozone. Examples of the first groups of materials which catalytically decompose ozone are such materials as silver, platinum, nickel, gold, palladium, iron or alloys thereof and other metals as well as metallic oxides and zeolitic molecular sieves. Another known catalyst that may be used to decompose ozone is Hopcalite which is a tradename belonging to the Mine Safety Appliance Corporation and chemically consists of a coprecipitate of manganese dioxide and cupric oxide. Modified Hopcalite materials are coprecipitated manganese dioxide and cupric oxide which have been doped by or treated with other chemicals or additions such as metal oxides e.g., nickel oxide, metal hydroxide e.g. nickel hydroxide and the like. Examples of the materials which are known to absorb ozone include high surface area materials such as activated carbon including charcoal. In addition charcoal impregnated with catalytic materials such as sodium iodide and noble metals are effective. Typically these particulate neutralizing materials have surface areas of the order of about 300 square meters per gram to 1500 square meters per gram.

The multipurpose filtering material is preferably made by coating the foraminous support matrix of an aqueous solution of the alkali metal silicate and before the aqueous solution has dehydrated or dried contacting the coated support matrix with the particulate neutralizer and thereafter drying the filter material to enable the alkali metal silicate to bind the particulate material to the supporting matrix. This may be done by spraying the aqueous alkali metal solution onto the foraminous matrix or by immersing the foraminous matrix into a bath of the alkali metal silicate solution compressing it as by squeezing it and releasing the compression to provide a substantially uniform coating of silicate solution on the foraminous matrix. Thereafter particulate neutralizer may be added to the wetted foraminous matrix by any suitable technique such as mixing in a container, spraying it on or hand sprinkling it on. Following the addition of the particulate neutralizer to the silicate coated matrix filter material it may be heated in an oven to drive off solvents. This procedure is preferred since it enables alkali metal silicate to act as a binder for the particulate neutralizer material and enables the particulate neutralizer material to maximize its surface area so that it is substantially exposed to the flow of gaseous material when used in a filtering or reactive environment. It should be noted in the immersion technique the aqueous alkali metal silicate solution penetrates the surface of the foam which may be discerned merely by cutting the foam with scissors. Preferably the alkali metal silicate solution is soaked all the way through the foam material. Alternatively, of course, the aqueous alkali metal silicate solution could be dried to form a dry adherent film and thereafter the particulate neutralizer material adhesively bound to the dry silicate coated material. Suitable adhesives for this approach are ethylene vinyl acetate and epoxy resins. The foraminous support matrix may be initially coated with alkali metal silicate, dried and subsequently coated again with the alkali metal silicate solution prior to adding the particulate neutralizing material. This will enable buildup of the alkali metal silicate layer if desired and can be controlled to provide the appropriate balance between an impedance and surface area. It should be noted that if the particulate neutralizing material is added to the support matrix first which is thereafter coated with the alkali metal silicate solution that the alkali metal silicate solution tends to cover the particulate neutralizing material thereby reducing its efficiency in the filtering device.

The invention will be further illustrated with reference to the following example in which all parts are by weight unless otherwise noted.

EXAMPLE

A pad about 5"×5"×½" of a reticulated open cell foam, Scottfoam SIFQ available from Scottfoam, Eddystone, PA., of an ester type polyurethane having 8 pores per linear centimeter was dipped into an aqueous dispersion of semicolloidal graphite in a potassium silicate binder, Electrodag RW22932 available from Acheson Colloids, Port Huron, Mich., having a silica to oxide ratio of about 2.1. Thereafter, the pad was removed and dried in an oven for 15 minutes at a temperature of about 150° F. The foam pad was subsequently redipped, removed and partially dried in air until tacky. The coated foam was then added to a bag containing finely ground activated carbon, available from Mine Safety Appliance Corporation as number 459324 and manually shaken for about one minute. The foam was removed from the bag and dried in an oven for 15 minutes at 150° F. after which excess carbon was shaken off. A piece of the treated composite foam was put in an ammonia test fixture wherein the challenge stream contained about 7 parts per million of ammonia at about 45 feet per minute air flow at 70° F. The output concentration of ammonia was measured at 0, 20, 30, 40 and 75 minutes and provided an efficiency overtime at particular times as represented by the following table in which efficiency is defined as $$\frac{\text{input ammonia concentration} - \text{output ammonia concentration}}{\text{input ammonia concentration}}$$

| Time (minutes) | Efficiency |
|---|---|
| 0 | 100% |
| 20 | 75% |
| 30 | 60% |
| 40 | 50% |
| 75 | 0% |

In addition this filter matrix provided a physical filter for particulate material and improved flammability since it passed the UL 94 horizonal burn test and the untreated foam did not pass this test.

Thus according to the present invention a multipurpose filtering material can be tailored to have a variety of properties performing several functions. In the preferred embodiment, the alkali silicate in addition to functioning as a neutralizer for nitrogen oxides may also function as an adhesive for the particulate neutralizer material such as activated carbon, and may also lend fire resistance to the foraminous matrix. As illustrated, a filtering material may be used to filter incoming air streams or outgoing air streams in an electrostatographic reproducing apparatus. It has particular application in those environments wherein ammonia may be present in the incoming air which could react with the nitrous oxide species to form ammonium nitrate which would tend to plate out and contaminate critical elements in the imaging apparatus. In addition it may act as a physical filter to trap particulate material entrained in the gaseous material from entering or escaping the volume in which it is contained.

All the patents of the references referred to herein are hereby incorporated by reference in their entirety into the instant specification.

While the invention has been described with reference to specific embodiments it will be apparent to those skilled in the art that many alternatives modifications and variations may be made. For example, while the invention has been illustrated as having application for foraminous support matrix' such as foams, fibrous materials that will be appreciated that it has equal application with regard to other support matrix' which include particulate material such as gravel and sand. In addition while the multipurpose filtering material has been illustrated with reference to filtering operation in inlet and outlet gaseous streams, it has equal application in recirculating gaseous streams. Furthermore, while the invention has been illustrated as having application in reproducing apparatus and in particular to electrostatographic reproducing apparatus it will be understood that it may also have application in other imaging systems. Accordingly it is intended to embrace such modifications and alternatives as may fall within the spirit and scope of the appended claims.

What is claimed is:

1. A multipurpose filtering material comprising a foraminous support matrix having a plurality of interconnecting voids to permit low impedance to the flow of gaseous material therethrough but sufficient to trap particulate material entrained in the gaseous material, the surface of said support matrix being substantially coated with a thin dehydrated alkaline film of an alkali metal silicate to neutralize nitrogen oxide species in the gaseous material, and having ahesively bound thereto a particulate neutralizer for another noxious gas, the surface of said particulate neutralizer being substantially exposed to the flow of gaseous material.

2. The filtering material of claim 1 wherein said foraminous support matrix is a reticulated open cell foam.

3. The filtering material of claim 1 wherein said foraminous support matrix is a fibrous material.

4. The filtering material of claim 1 wherein said dehydrated alkaline film is the dehydrated product of an aqueous sodium silicate solution having a silica to oxide weight ratio of from about 1.6 to about 3.75, density of from about 35° Bé to about 60° Bé at 20° C. and a viscosity of from about 200 to about 800 centipoises.

5. The filtering material of claim 4 wherein said silica to oxide ratio is about 2.

6. The filtering material of claim 1 wherein said dehydrated alkaline film is the dehydrated product of an aqueous potassium silicate solution having a silica to oxide weight ratio of from about 2.1 to 2.5, a density of from about 30° Bé to about 40° Bé at 20° C. and a viscosity of from about 7 to about 1050 centipoises.

7. The filtering material of claim 1 wherein said particulate neutralizer is activated carbon.

8. The filtering material of claim 1 wherein said particulate neutralizer is Hopcalite.

9. The filtering material of claim 1 wherein said foraminous material has a pore size of from about 4 to 40 pores per linear centimeter.

10. The filtering material of claim 1 wherein said particulate neutralizer has a surface area of from about 300 to about 1500 square meters per gram.

11. The filtering material of claim 1 wherein said dehydrated alkaline film of an alkali metal silicate adhesively binds said particulate neutralizer.

12. A method of making the multipurpose filtering material of claim 1 comprising providing said foraminous support matrix, coating said matrix with an aqueous solution of an alkali metal silicate and before said aqueous solution has dehydrated contacting said coated support matrix with the particulate neutralizer and drying said filter material to bind said particulate neutralizer to said support matrix.

13. The method of claim 11 wherein said foraminous support matrix is coated with the aqueous solution of an alkali metal silicate by immersing said matrix in a bath of said aqueous solution.

14. The method of claim 12 wherein said coated support matrix is contacted with said particulate neutralizer by mixing in a container.

15. In an imaging apparatus including at least one corona discharge electrode, means for circulation of an air stream into, through and out of said apparatus, said air stream being directed through a multipurpose filtering material comprising;

a foraminous support matrix having a plurality of interconnecting voids to permit low impedance to the flow of gaseous material therethrough but sufficient to trap particulate material entrained in the gaseous material, the surface of said support matrix being substantially coated with a thin dehydrated alkaline film of an alkali metal silicate to neutralize nitrogen oxide species in the gaseous material, and having adhesively bound thereto a particulate neutralizer for another noxious gas, the surface of said particulate neutralizer begin substantially exposed to the flow of gaseous material.

16. The apparatus of claim 15 wherein said foraminous support matrix is a reticulated open cell foam.

17. The apparatus of claim 15 wherein said foraminous support matrix is a high loft fibrous material.

18. The apparatus of claim 15 wherein said dehydrated alkaline film is the dehydrated product of an aqueous sodium silicate solution having a silica to oxide weight ratio of from about 1.6 to about 3.75, density of from about 35° Bé to about 60° Bé at 20° C. and a viscosity of from about 200 to about 800 centipoises.

19. The apparatus of claim 17 wherein said silica to oxide ratio is about 2.

20. The apparatus of claim 17 wherein said dehydrated alkaline film is the dehydrated product of an aqueous potassium silicate solution having a silica to oxide weight ratio of from about 2.1 to 2.5, a density of from about 30° Bé to about 40° Bé at 20° C. and a viscosity of from about 7 to about 1050 centipoises.

21. The apparatus of claim 17 said particulate neutralizer is activated carbon.

22. The apparatus of claim 17 wherein said particulate neutralizer is Hopcalite.

23. The apparatus of claim 17 wherein said foraminous material has a pore size of from about 4 to 40 pores per linear centimeter.

24. The apparatus of claim 17 wherein said particulate neutralizer has a surface area of from about 300 to about 1500.

25. The apparatus of claim 17 wherein said dehydrated alkaline film of an alkali metal silicate adhesively binds said particulate neutralizer.

26. The apparatus of claim 15 wherein said filtering material is positioned at the inlet of said air stream.

27. The apparatus of claim 15 wherein said filtering material is positioned at the outlet of said air stream.

28. The apparatus of claim 15 wherein said imaging apparatus comprises an electrostatographic reproducing apparatus.

* * * * *